Patented Oct. 24, 1944

2,361,243

UNITED STATES PATENT OFFICE 2,361,243

MANUFACTURE OF ARTIFICIALLY SMOKED PIPE BOWLS

Max David Schwab, Uddevalla, Sweden

No Drawing. Application November 9, 1942, Serial No. 465,045. In Sweden November 22, 1941

6 Claims. (Cl. 131—172)

The present invention relates to improvements in the manufacture of artificially smoked pipe bowls, and one object of the invention is to provide an improved material for producing such artificially smoked condition of the cavity of pipe bowls. For this purpose I provide a mixture containing a filler such as silicate of soda, chalk, lamp-black or the like, a sacchariferous substance such as honey, syrup, sugar solution or the like, and distilled alcoholic liquor such as arrack, rum, whisky or the like. The purpose of the filler is to give body to the coating, the purpose of the sacchariferous substance is to hold the filler in place until the coating has been fixed by heating and to supply a carbonaceous binder for the filler when it is decomposed by heating, and the purpose of the alcoholic liquor is to thin the composition and cause it to penetrate into the pores of the wood.

The mixture may be formed as a doughy, semi-liquid or liquid substance with which the cavity of the pipe bowl is embrocated or covered. After said procedure the cavity is heated, for instance by introduction into the cavity of a hot body preferably corresponding in shape to the cavity, an electric heating body, a gas-jet or the like.

Preferably the material according to the invention may contain honey and arrack, rum or whisky but the invention is not limited to the use of such alcohols and also includes the use of other distilled alcoholic liquors such as pure technical alcohol, brandy, liqueur or the like. A suitable mixture may comprise about ten parts of lamp-black, four parts of honey and one or two parts of arrack.

The mixture with which the pipe bowl is treated for producing the artificially smoked condition or the smoked cavity of the bowl itself may also be supplied with an essence or the like, for instance peppermint, for producing a pleasant flavour or odour upon use of the pipe.

Naturally the above examples are by no means limitative and it should be understood that the invention may be modified in different ways within the scope of the claims. The composition of the mixture is consequently different for pipe bowls of different materials and different qualities.

What I claim is:

1. Method of producing an artificially smoked pipe bowl which comprises applying a doughy to liquid composition consisting essentially of a solid non-combustible filler, a sacchariferous substance and alcohol to the surface of the cavity of the pipe bowl and then heating said composition.

2. Method as defined in claim 1 in which the coated surface of the cavity of the pipe bowl is heated by the introduction of a source of heat into said cavity.

3. Method as defined in claim 1 in which the alcohol component of the composition is supplied as whiskey.

4. Method as defined in claim 1 in which the alcohol component of the composition is supplied as rum.

5. Method as defined in claim 1 in which the alcohol component of the composition is supplied as arrack.

6. Method as defined in claim 1 in which the composition consists essentially of lamp black, honey and arrack.

MAX DAVID SCHWAB.